(12) United States Patent
Chen

(10) Patent No.: US 9,309,937 B2
(45) Date of Patent: Apr. 12, 2016

(54) WHEEL CYLINDER ADJUSTER

(71) Applicant: Shu-Hui Chen, Taichung (TW)

(72) Inventor: Shu-Hui Chen, Taichung (TW)

(*) Notice: Subject to any disclaimer, the term of this patent is extended or adjusted under 35 U.S.C. 154(b) by 78 days.

(21) Appl. No.: 14/484,288

(22) Filed: Sep. 12, 2014

(65) Prior Publication Data

US 2016/0076608 A1  Mar. 17, 2016

(51) Int. Cl.
  *B23P 19/04* (2006.01)
  *F16D 65/00* (2006.01)
  *B25B 27/00* (2006.01)

(52) U.S. Cl.
  CPC ............ *F16D 65/0043* (2013.01); *B25B 27/00* (2013.01); *Y10T 29/53683* (2015.01)

(58) Field of Classification Search
  USPC .......................................................... 29/240
  See application file for complete search history.

(56) References Cited

U.S. PATENT DOCUMENTS

| | | | | |
|---|---|---|---|---|
| 2,592,420 A * | 4/1952 | Harrison | ............... | B25B 27/023 29/265 |
| 5,018,261 A * | 5/1991 | Markous | ............... | B25B 27/023 29/239 |
| 5,269,053 A * | 12/1993 | Hicks | ................... | B25B 27/0035 29/239 |
| 6,085,398 A * | 7/2000 | Arch | .................... | B25B 27/0035 29/239 |
| 6,192,566 B1 * | 2/2001 | Dunum | ............... | B25B 27/0035 29/233 |
| 6,574,846 B1 * | 6/2003 | Kang | .................. | B25B 27/0021 29/239 |
| 8,661,638 B2 * | 3/2014 | Chen | .................... | B25B 27/0035 29/239 |

* cited by examiner

*Primary Examiner* — Lee D Wilson
*Assistant Examiner* — Alvin Grant

(57) ABSTRACT

A wheel cylinder adjuster includes a rotary unit and a driving unit connected with the rotary unit. The rotary unit includes a rotary disk, a fixing member, two positioning members, a resilient ring, a restriction member and a clip. The rotary disk has a guide groove designed in a shape containing two semi-ovals. Two stepped slots are defined through the fixing member and the positioning members extend through the two stepped slots. Each positioning member has a guide tip which is located in the guide groove. The resilient ring is mounted to the positioning members and the tubular portion. The rotary disk is rotated and the guide tips of the positioning members more in the stepped slots so as to adjust the distance between the positioning members so as to be operated to different sizes of the wheel cylinders.

4 Claims, 12 Drawing Sheets

WHEEL CYLINDER ADJUSTER

BACKGROUND OF THE INVENTION

1. Fields of the Invention

The present invention relates to a wheel cylinder adjuster, and more particularly, to an adjuster for different sizes of wheel cylinders.

2. Descriptions of Related Art

The conventional a wheel cylinder adjuster generally comprises a disk that is connected axially to the cylinder and a wrench that is connected to the disk. The disk has a hollow tubular portion extending from a center thereof and the size of the tubular portion is matched with the port of the valve. Two pivotal holes are located diametrically of the tubular portion. A positioning hole is defied in an outside of the tubular portion so that a positioning rod is inserted into the positioning hole. The wrench has a driving member at the distal end thereof, and a recessed area is defined in the driving member. A magnet is located in the recessed area. Two protrusions extend from the outer periphery of the recessed area so as to be pivotably connected to the pivotal holes of the tubular portion. The tubular portion is inserted into the port of the valve and the positioning rod is engaged with the notch of the wheel cylinder.

The adjuster is stored in a tool box 1 as shown in FIG. 1, and there are two sets of the wrenches 10, 11 and multiple disks 12 in different sizes. The weight of the two sets of the wrenches 10, 11 and the multiple disks 12 is so heavy that the user is difficult to carry the tool box easily. The size of the tool box is big and occupies spaces.

The present invention intends to provide an adjuster for different sizes of wheel cylinders so as to eliminate the shortcomings mentioned above.

SUMMARY OF THE INVENTION

The present invention relates to a wheel cylinder adjuster which comprises a rotary unit and a driving unit wherein the driving unit includes a threaded rod, a sleeve, a positioning board and a handle. In characterization that the rotary unit is consisted of a rotary disk, a fixing member, at least two positioning members, a resilient ring, a restriction member and a clip. The rotary disk has a through hole, and a guide groove defined in the first side of the rotary disk. Two recesses are defined in the second side of the rotary disk and located diametrically relative to the through hole. Each recess has a contact face on one of two insides of the recess. The fixing member is connected to the first side of the rotary disk and has a recessed area defined in one side thereof. The recessed area faces the rotary disk. A tubular portion extends from the center of the recessed area and has a groove defined in the outside thereof. A polygonal hole is defined in the distal end of the tubular portion. At least two stepped slots are defined through the fixing member and the at least two positioning members extend through the at least two stepped slots. Each of the at least two positioning members has a flange, and a guide tip extends from the distal end of each of the at least two positioning members. The guide tips of the at least two positioning members are located in the guide groove of the rotary disk. The resilient ring is mounted to the at least two positioning members and the tubular portion of the fixing member. The restriction member is connected to the second side of the rotary disk and mounted to the tubular member of the fixing member. The restriction member has a hole, and two protrusions extend from the first side of the restriction member and are engaged with the two recesses of the rotary disk. The clip is engaged with the groove of the tubular member.

Preferably, a resilient plate is located between the restriction member and the clip.

Preferably, the guide groove is designed in a shape containing two semi-ovals.

Preferably, the guide groove is designed in a shape containing three semi-ovals.

The primary object of the present invention is to provide an adjuster which is able to be operated to different sizes of the wheel cylinders.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
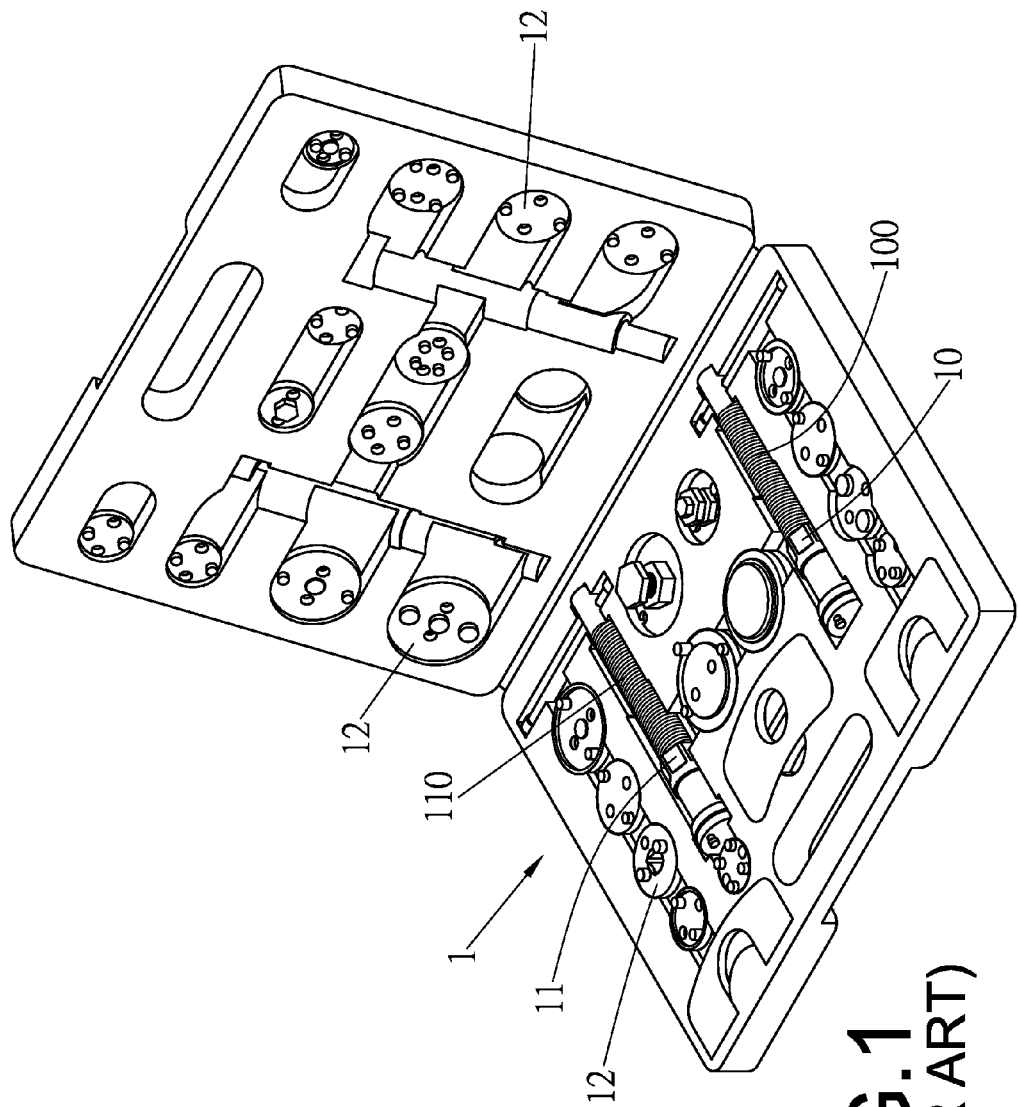
FIG. 1 shows the conventional wheel cylinder adjuster stored in a tool box.
Figure 2:
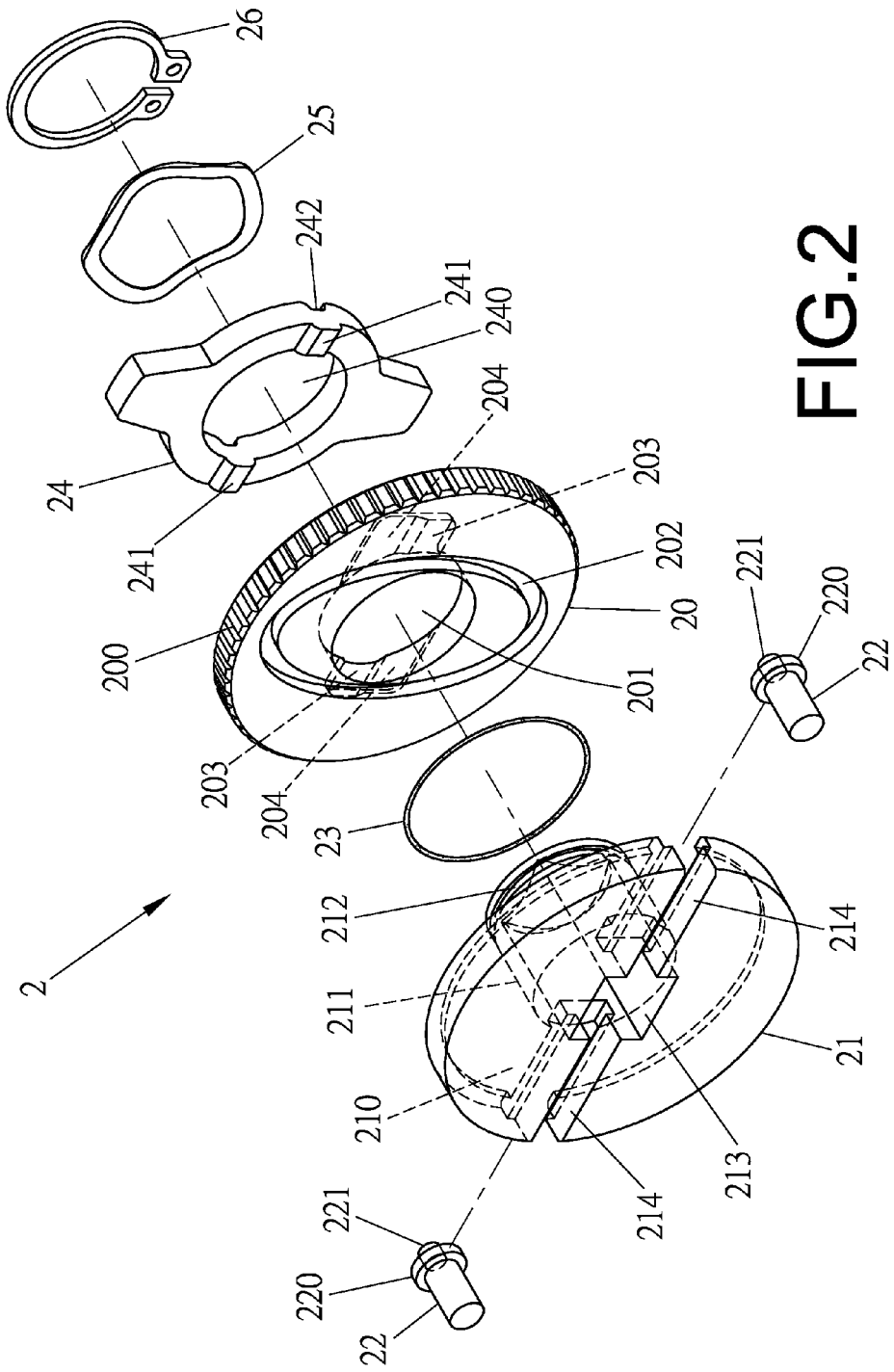
FIG. 2 is an exploded view of the rotary unit of the adjuster of the present invention.
Figure 3:
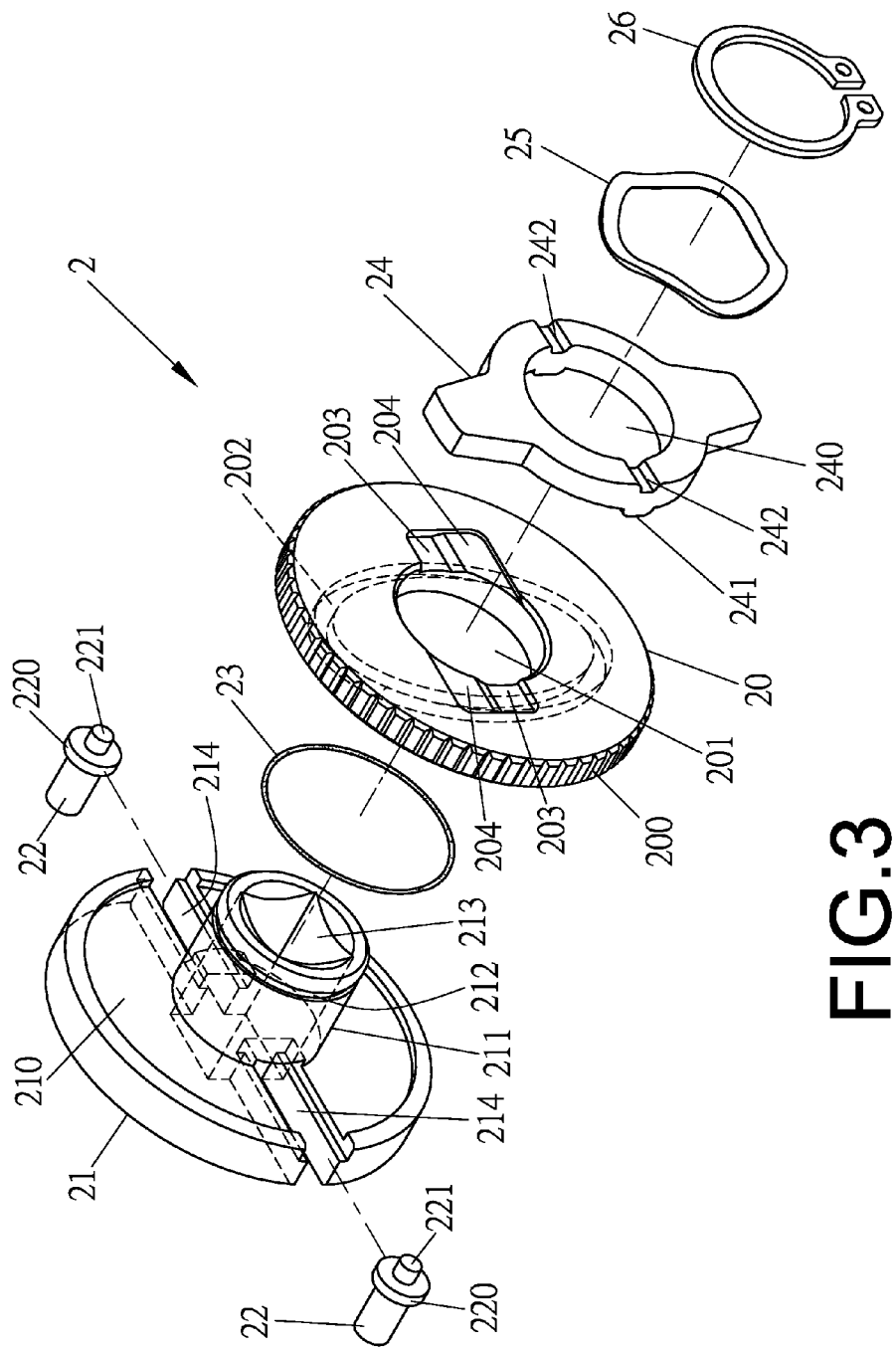
FIG. 3 is another exploded view of the rotary unit of the adjuster of the present invention.
Figure 4:
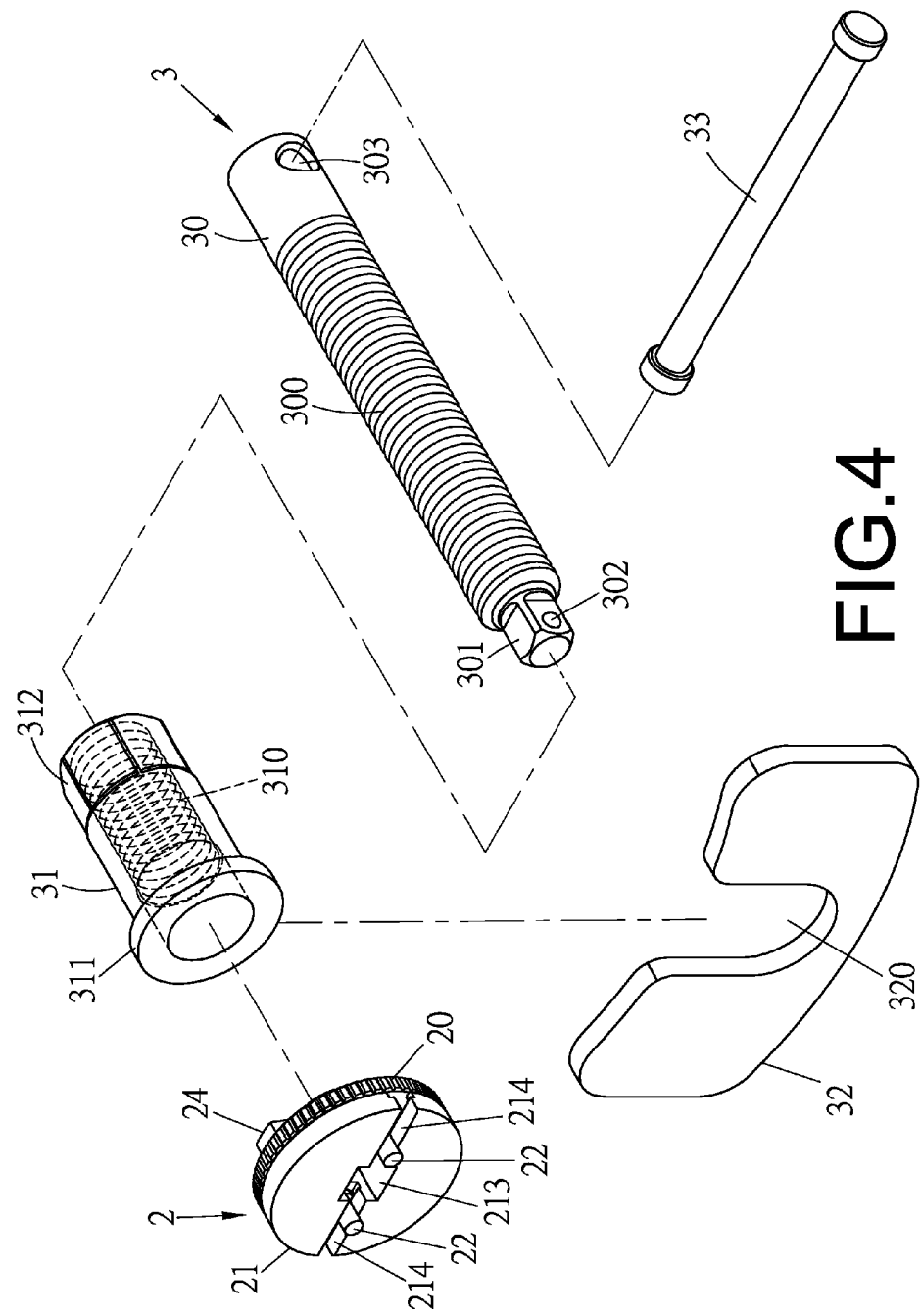
FIG. 4 is an exploded view of the rotary unit and the driving unit of the adjuster of the present invention.
Figure 5:
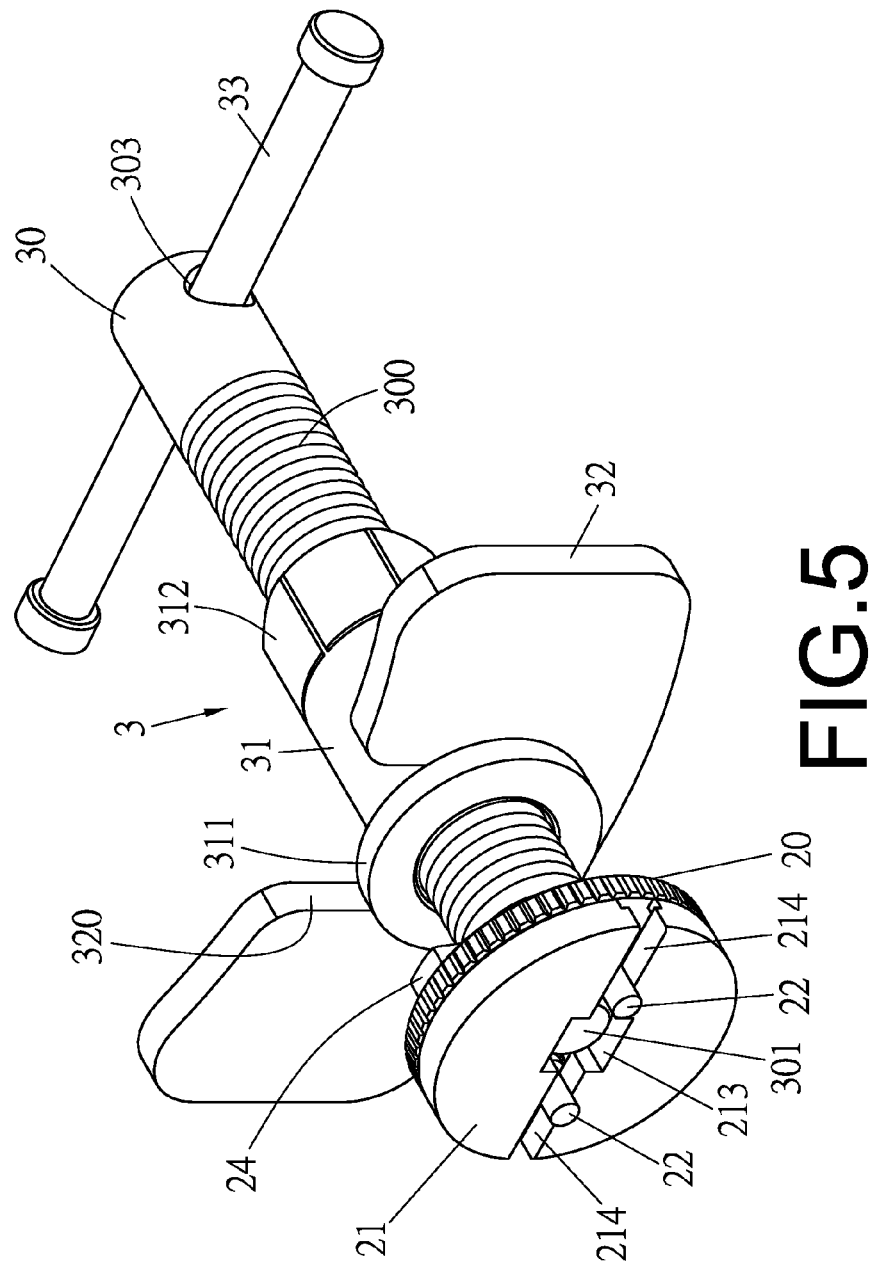
FIG. 5 is a perspective view show the adjuster of the present invention.

Referring to FIGS. 2 to 10, the adjuster of the present invention comprises a rotary unit 2 as shown in FIGS. 2 and 3, and a driving unit 3 as shown in FIG. 4. The rotary unit 2 is able to be connected with wheel cylinders of different sizes and comprises a rotary disk 20, a fixing member 21 two positioning members 22, a resilient ring 23, a restriction member 24 and a clip 26. The rotary disk 20 has an anti-slip surface 200 defined in the outside thereof and a through hole 201 is defied centrally through the rotary disk 20. A guide groove 202 is designed in a shape containing two semi-ovals and defined in the first side of the rotary disk 20. Two recesses 203 are defined in the second side of the rotary disk 20 and located diametrically relative to the through hole 201. Each recess 203 has a contact face 204 on one of two insides of the recess 203. The fixing member 21 is connected to the first side of the rotary disk 20 and has a recessed area 210 defined in one side thereof. The recessed area 210 faces the rotary disk 20. A tubular portion 211 extends from the center of the recessed area 210 and has a groove 212 defined in the outside thereof. A polygonal hole 213 is defined in the distal end of the tubular portion 211. Two stepped slots 214 are defined through the fixing member 21 and communicate with the polygonal hole 213. The two positioning members 22 are connected to the rotary disk 20 and the fixing member 21. The two positioning members 22 extend through the two stepped slots 214. Each of the two positioning members 22 has a flange 220 and a guide tip 221 extends from the distal end of each of the two positioning members 22. The guide tips 221 of the two positioning members 22 are located close to the two respective flanges 220 and inserted in the guide groove 202 of the rotary disk 20. The resilient ring 23 is mounted to the two positioning members 22 and the tubular portion 211 of the fixing member 21. The restriction member 24 is connected to the second side of the rotary disk 20 and mounted to the tubular member 211 of the fixing member 21. The restriction member 24 has a hole 240. Two protrusions 241 extend from the first side of the restriction member 24 and are engaged with the two recesses 203 of the rotary disk 20. Two slots 242 are formed on the second side of the restriction member 24 and located corresponding to the two protrusions 241. The resilient plate 25 is located between the restriction member 24 and the clip 26. The clip 26 engaged with the groove 212 of the fixing member 21.

The driving unit 3 comprises a threaded rod 30, a sleeve 31, a positioning board 32 and a handle 33. The threaded rod 30 has outer threads 300 defined in the outside thereof. A polygonal protrusion 301 extends from one end of the threaded rod 30 so as to be engaged with the polygonal hole 213 of the fixing member 21. A bead 320 is retractably connected to the polygonal protrusion 301 and a through hole 303 is defined transversely through the other end of the threaded rod 30. The sleeve 31 is threadedly connected to the outer threads 300 of the threaded rod 30 by the inner threads 310 defined in the inside of the sleeve 31. A flange 311 extends from the first end of the sleeve 31 and the second end of the sleeve 31 has polygonal sides. The positioning board 32 is connected to the sleeve 31 and has a notch 320. The handle 33 extends through the through hole 303 of the threaded rod 30.

Figure 6:
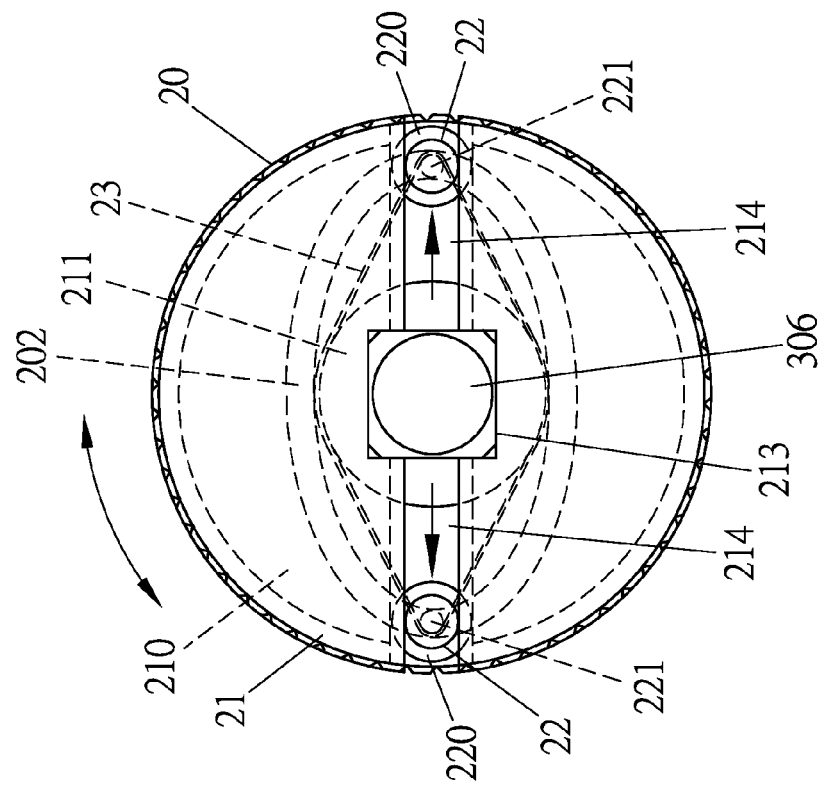
FIG. 6 shows that the two positioning members are moved toward each other.
Figure 10:
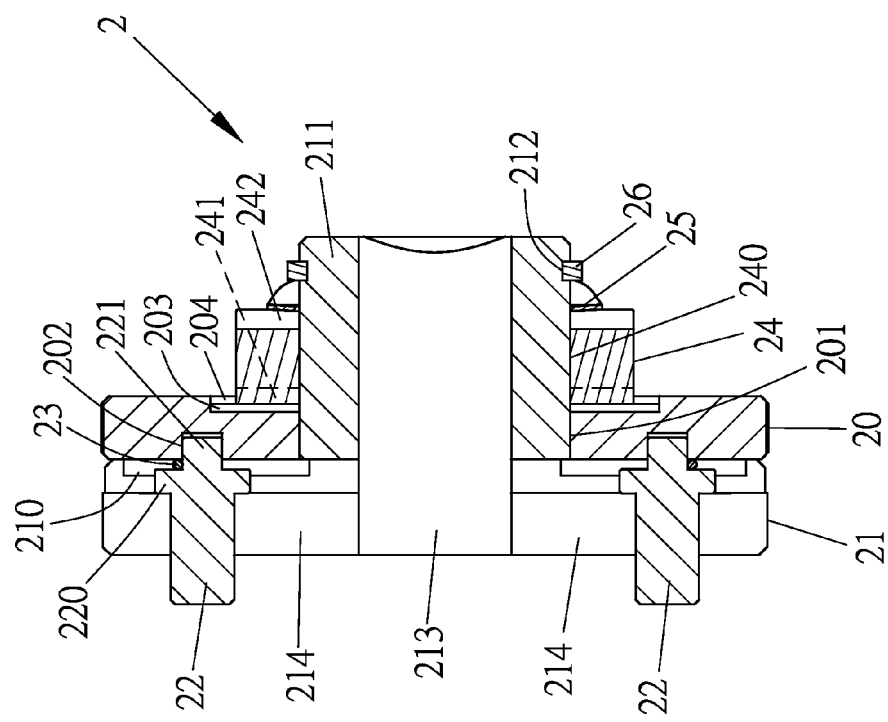
FIG. 10 is a partial cross sectional view to show that the restriction member is rotated to position the rotary disk.
Figure 11:
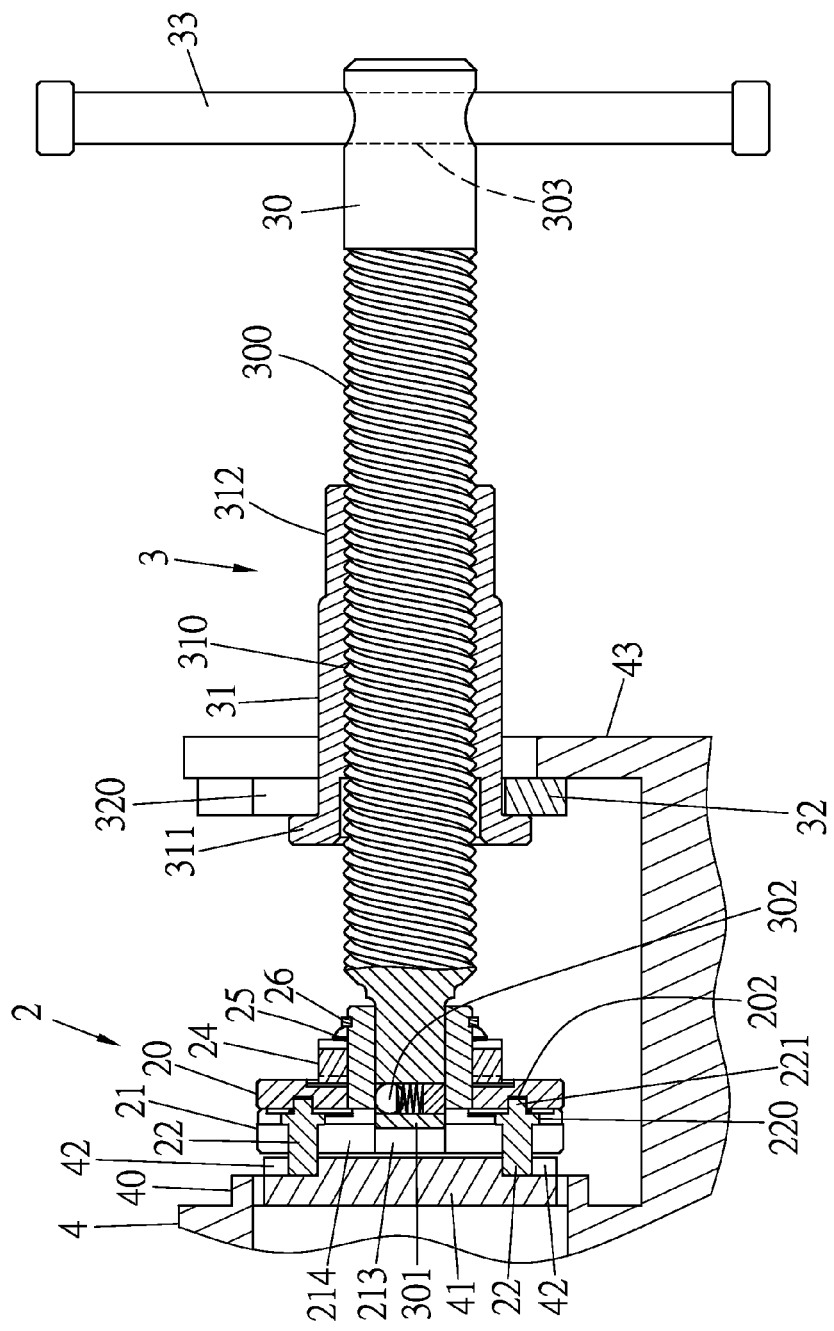
FIG. 11 is a cross sectional view to show that the adjuster of the present invention is used to adjust a wheel cylinder.
Figure 12:
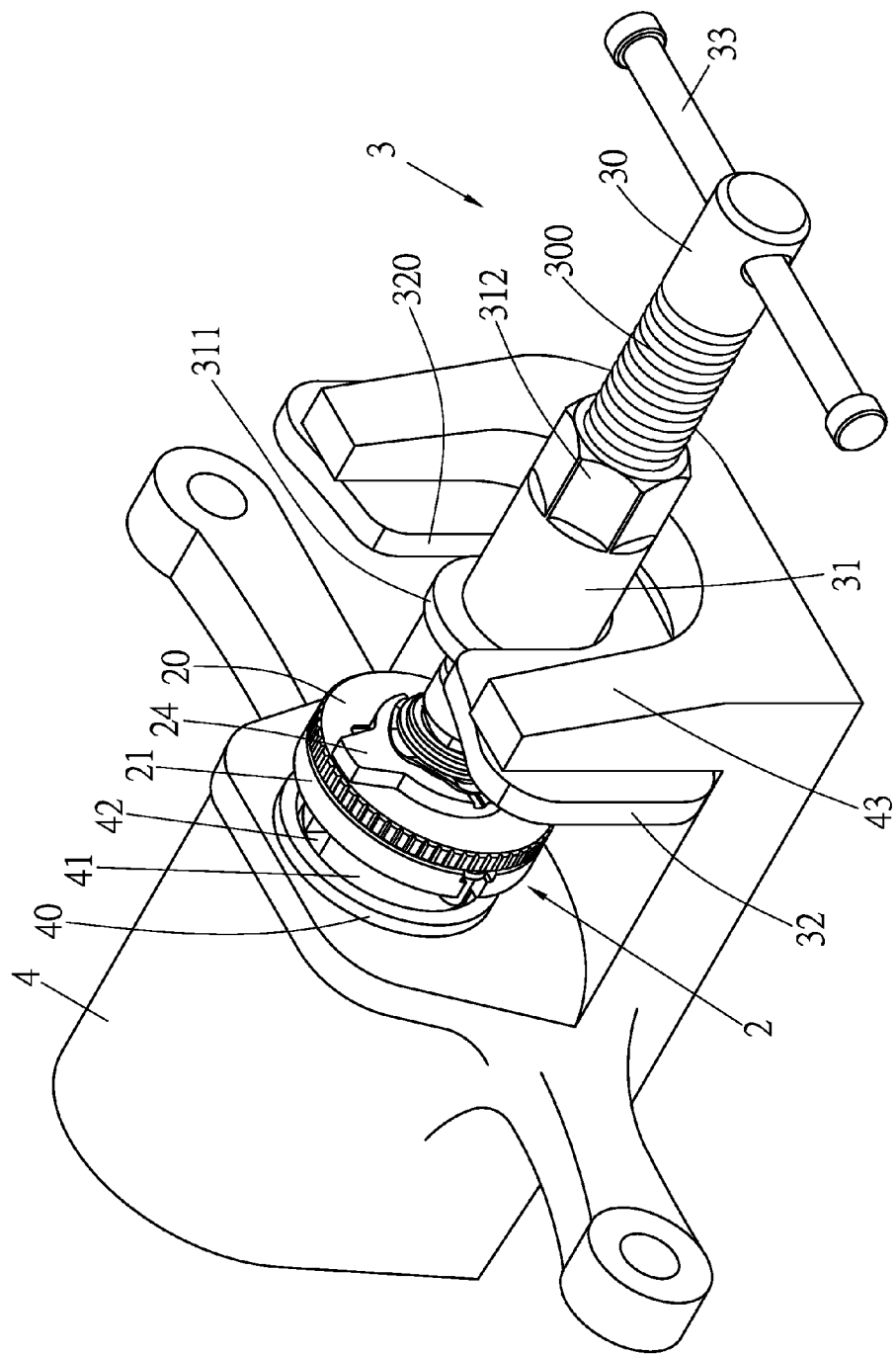
FIG. 12 is a perspective view to show that the adjuster of the present invention is used to adjust a wheel cylinder.

When assembling the adjuster, the two positioning members 22 are inserted into the stepped slots 214 so that the flanges 220 of the two positioning members 22 are located within the stepped slots 214. The resilient ring 23 is then mounted to the two positioning members 22 and the tubular portion 211 of the fixing member 21 as shown in FIG. 6. The resilient ring 23 is located in the recessed area 210 of the fixing member 21 as shown in FIG. 10. The first side of the rotary disk 20 is matched to the fixing member 21 and the tubular member 211 extends through the through hole 201 of the rotary disk 20. The guide tips 221 of the two positioning members 22 are inserted into the guide groove 202. The restriction member 24 is matched to the second side of the rotary disk 20 to allow the two protrusions 241 of the restriction member 24 are located in the two recesses 203. The resilient plate 25 is then connected to the other side of the restriction member 24 and is mounted to the tubular member 211 of the fixing member 21. The sleeve 31 is threadedly connected to the outer threads 300 of the threaded rod 30, and the sleeve 31 is engaged with the notch 320 of the positioning board 32. The handle 33 extends through the through hole 303 of the threaded rod 30. The polygonal protrusion 301 of the threaded rod 30 is engaged with the polygonal hole 213 of the fixing member 21. The bead 302 contacts against the inside of the polygonal hole 213 as shown in FIG. 11 to connect the driving unit 3 to the rotary unit 2.

Figure 7:
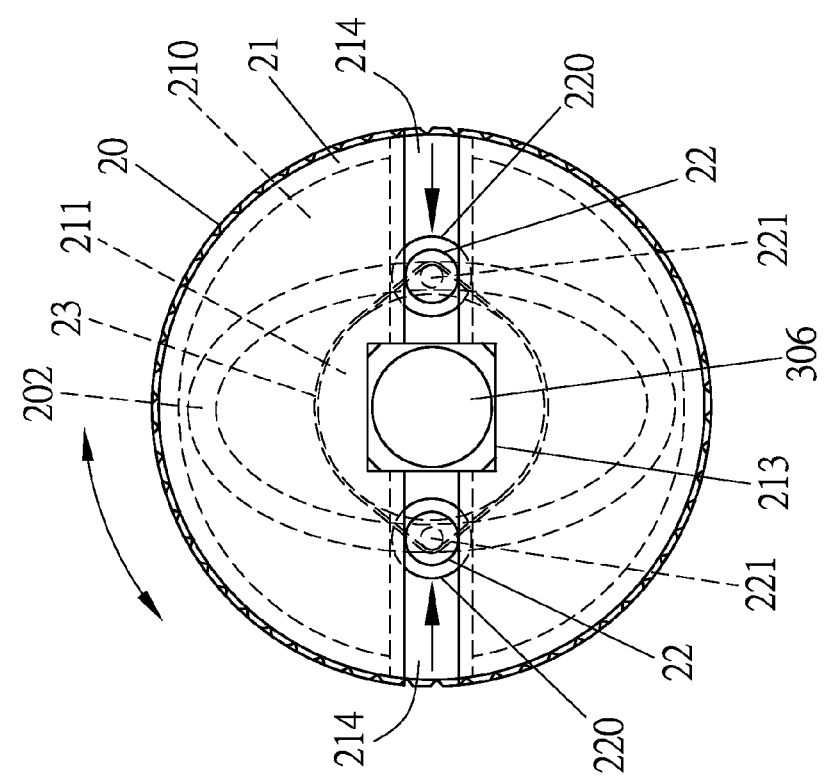
FIG. 7 shows that the two positioning members are moved away from each other.
Figure 8:
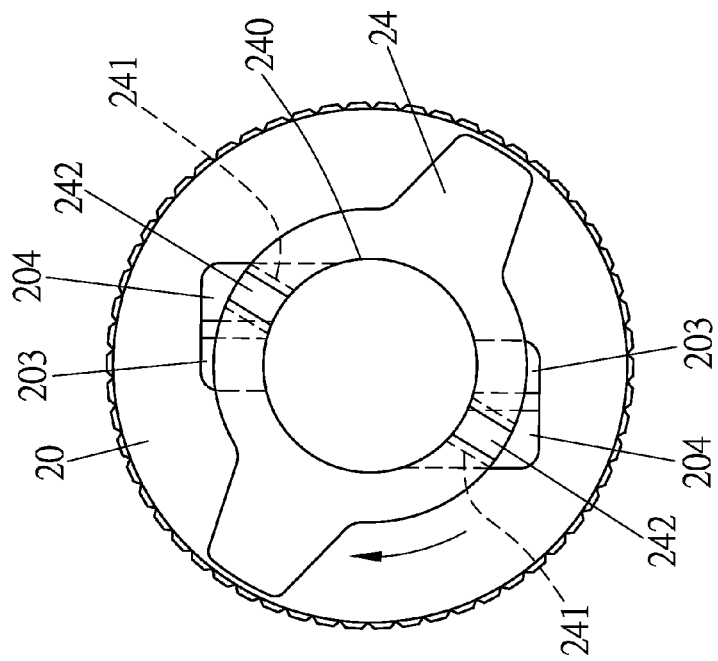
FIG. 8 is an end view to show the restriction member and the rotary disk of the adjuster of the present invention.
Figure 9:
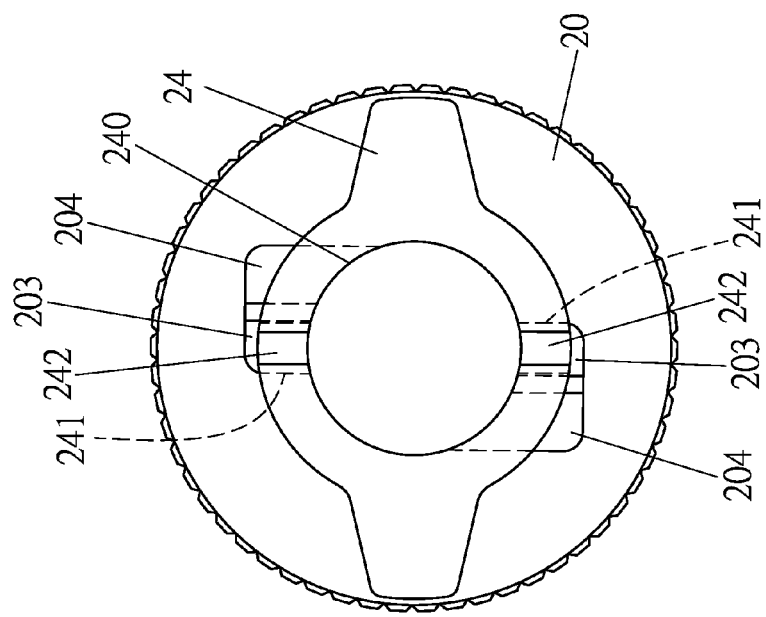
FIG. 9 is an end view to show that the restriction member is rotated.

When in use, as shown in FIGS. 5 to 20, the rotary disk 20 is rotated so that the guide tips 221 of the positioning members 22 move along the guide groove 202, such that the two positioning members 22 are moved linearly toward each other or away from each other along the two stepped slots 214 as shown in FIGS. 6 and 7. The two positioning members 22 are restricted by the resilient ring 23 so that when the positioning members 22 are moved away from each other as shown in FIG. 7, the resilient ring 23 is stretched, and when the positioning members 22 are moved toward each other as shown in FIG. 6, the resilient ring 23 is retracted to move the two positioning members 22 back to their initial positions. This is to say, the distance between the two positioning members 22 is adjusted along with the 360 degrees of rotation of the rotary disk 20, such that the distance between the two positioning members 22 can be adjusted according to the size of the valve 41 in the valve port 40. After the distance between the two positioning members 22 is adjusted, the restriction member 24 is rotated as shown in FIGS. 8 and 9, the protrusions 241 of the restriction member 24 are disengaged from the recesses 203 and contact the contact faces 204 of the stepped slots 214. The resilient plate 25 further pushes the restriction member 24 toward the rotary disk 20, so that the rotary disk 20 is securely matched to the fixing member 21, and the rotary disk 20 is not rotated randomly and the two positioning members 22 are positioned. When adjusting the wheel cylinder 4, the rotary unit 2 is connected to the polygonal protrusion 301 of the threaded rod 30 of the driving unit 3, the bead 302 on the polygonal protrusion 301 is retracted by being in contact with one of the insides of the polygonal hole 213. The rotary unit 2 is securely connected to the polygonal protrusion 301. The positioning board 32 is positioned to the frame 43 of the wheel cylinder 4, and the driving unit 3 and the sleeve 31 are connected to the wheel cylinder 4 wherein the sleeve 31 is engaged with the notch 320 of the positioning board 32 and the frame 43 of the wheel cylinder 4. The positioning members 22 of the rotary unit 2 are engaged with the recesses 42 of the valve 41 of the wheel cylinder 4. The sleeve 31 is rotated relative to the outer threads 300 of the threaded rod 30 so as to move the threaded rod 30 to move back and forth. Therefore, the rotary unit 2 on the threaded rod 30 is adjusted to contact against the valve 41 in the valve port 40. The handle 33 extends through the through hole 303 of the threaded rod 30. The user holds the handle 33 and rotate the threaded rod 30 of the driving unit 3, so that the threaded rod 30 is able to move forward and drives the rotary unit 2 to push the valve 41 in the valve port 40 inward to its initial position.

The present invention only uses the driving unit 3 and the rotary unit 2 to adjust the wheel cylinders 4 of different sizes. The rotary disk 20 is secured by the restriction member 24 and the resilient plate 25, and the two positioning members 22 do not move randomly.

Figure 13:
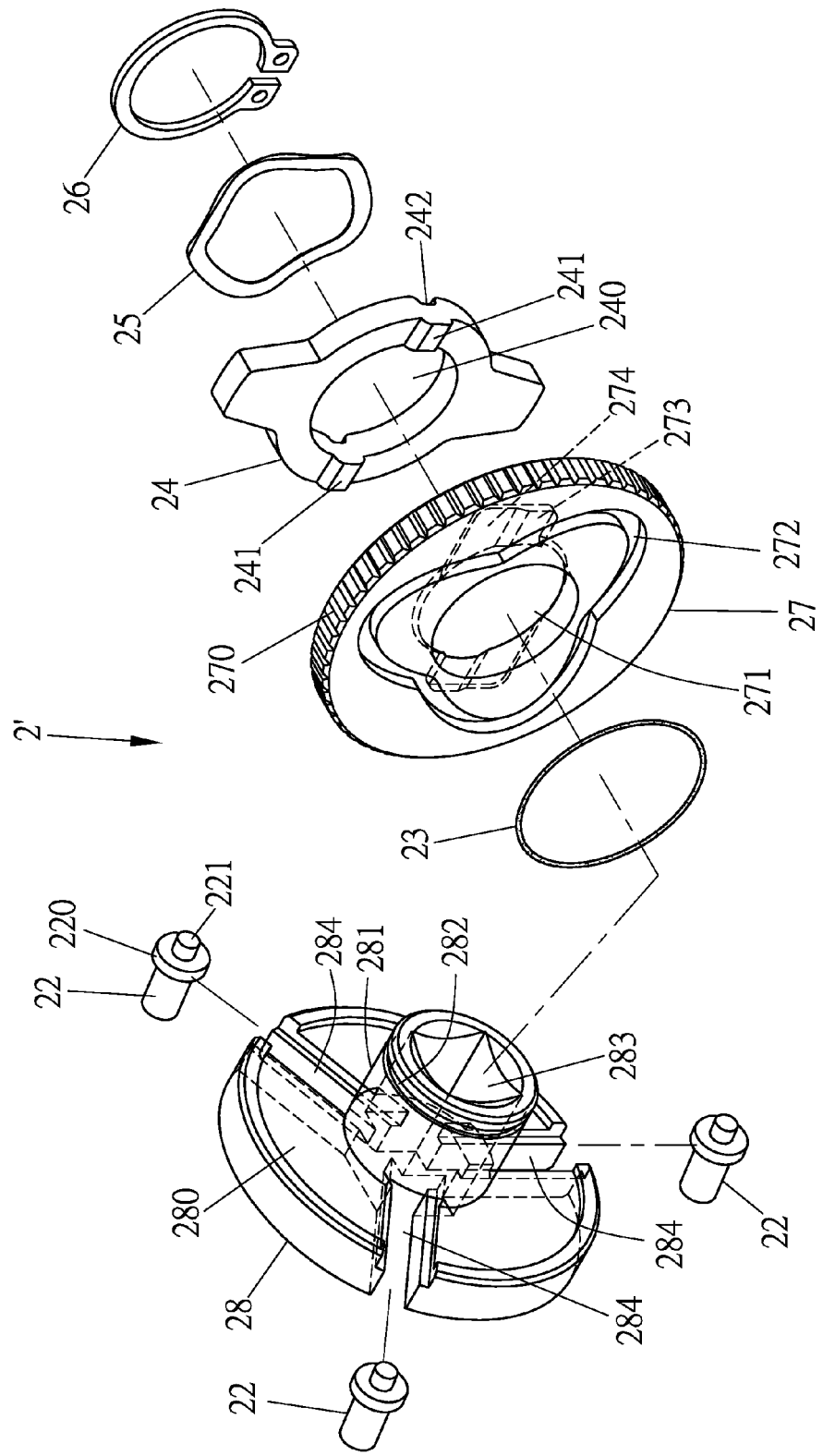
FIG. 13 is an exploded view to show the adjuster of the present invention.
Figure 14:
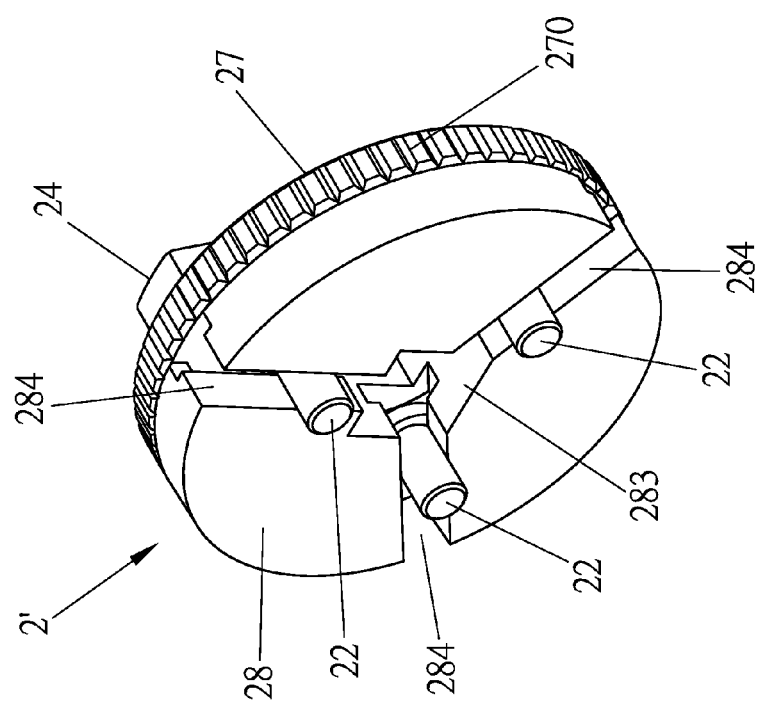
FIG. 14 is a perspective view of the adjuster of the present invention.

FIGS. 13 and 14 show another embodiment wherein the rotary unit 2' is connected with the driving unit 3 which is the same as the first embodiment mentioned above. The rotary unit 2 comprises a rotary disk 27, a fixing member 28, three positioning members 22, a resilient ring 23, a restriction member 24 and a clip 26. The rotary disk 27 has an anti-slip surface 270 defined in the outside thereof and a through hole 271 is defied centrally through the rotary disk 27. A guide groove 272 designed in a shape containing three semi-ovals is defined in the first side of the rotary disk 27. Two recesses 273 are defined in the second side of the rotary disk 27 and located diametrically relative to the through hole 271. Each recess 273 has a contact face 274 on one of two insides of the recess 273. The fixing member 28 is connected to the first side of the rotary disk 27 and has a recessed area 280 defined in one side thereof. The recessed area 280 faces the rotary disk 27. A tubular portion 281 extends from the center of the recessed area 280 and has a groove 282 defined in the outside thereof. A polygonal hole 283 is defined in the distal end of the tubular portion 281. Three stepped slots 284 are defined through the fixing member 28 and communicate with the polygonal hole 283. The three positioning members 22 are connected to the rotary disk 27 and the fixing member 28. The three positioning members 28 extend through the two stepped slots 284. Each of the three positioning members 22 has a flange 220 and a guide tip 221 extends from the distal end of each of the two positioning members 22. The guide tips 221 of the three positioning members 22 are located close to the two respective flanges 220 and inserted in the guide groove 272 of the rotary disk 27. The resilient ring 23 is mounted to the two positioning members 22 and the tubular portion 281 of the fixing member 28. The restriction member 24 is connected to the second side of the rotary disk 27 and mounted to the tubular member 281 of the fixing member 28. The restriction member 24 has a hole 240. Two protrusions 241 extend from the first side of the restriction member 24. Two slots 242 are formed on the second side of the restriction member 24 and located corresponding to the two protrusions 241. The resilient plate 25 is located between the restriction member 24 and the clip 26. The clip 26 engaged with the groove 282 of the fixing member 28.

While we have shown and described the embodiment in accordance with the present invention, it should be clear to those skilled in the art that further embodiments may be made without departing from the scope of the present invention.

What is claimed is:

1. A wheel cylinder adjuster, comprising:
a rotary unit having a rotary disk, a fixing member, at least two positioning members, a resilient ring, a restriction member and a clip, the rotary disk having a through hole, a guide groove defined in a first side of the rotary disk, two recesses defined in a second side of the rotary disk and located diametrically relative to the through hole, each recess having a contact face on one of two insides of the recess, the fixing member connected to the first side of the rotary disk and having a recessed area defined in a side thereof, the recessed area facing the rotary disk, a tubular portion extending from a center of the recessed area and having a groove defined in an outside thereof, a polygonal hole defined in a distal end of the tubular portion, at least two stepped slots defined through the fixing member and the at least two positioning members extending through the at least two stepped slots, each of the at least two positioning members having a flange, a guide tip extending from a distal end of each of the at least two positioning members, the guide tips of the at least two positioning members located in the guide groove of the rotary disk, the resilient ring mounted to the at least two positioning members and the tubular portion of the fixing member, the restriction member connected to the second side of the rotary disk and mounted to the tubular member of the fixing member, the restriction member having a hole, two protrusions extending from a first side of the restriction member and engaged with the two recesses of the rotary disk, the clip engaged with the groove of the tubular member.

2. The adjuster as claimed in claim 1, wherein a resilient plate is located between the restriction member and the clip.

3. The adjuster as claimed in claim 1, wherein the guide groove is designed in a shape containing two semi-ovals.

4. The adjuster as claimed in claim 1, wherein the guide groove is designed in a shape containing three semi-ovals.

\* \* \* \* \*